United States Patent [19]
Gerard

[11] Patent Number: 5,873,150
[45] Date of Patent: Feb. 23, 1999

[54] METHOD AND APPARATUS FOR DISTRIBUTING LONG FIBERS

[75] Inventor: Jacques H. Gerard, Olne, Belgium

[73] Assignee: N.V. Owens-Corning SA, Battice, Belgium

[21] Appl. No.: 826,959

[22] Filed: Apr. 9, 1997

[51] Int. Cl.⁶ .................................................. D01G 25/00
[52] U.S. Cl. ................................ 19/301; 19/296; 19/300; 19/305; 19/306; 19/307; 19/308
[58] Field of Search ............................. 19/296, 300, 301, 19/303, 304, 305, 306, 307, 308

[56] References Cited

U.S. PATENT DOCUMENTS

| | | | |
|---|---|---|---|
| 2,333,218 | 11/1943 | Von Pazsiczky | 83/91 |
| 2,890,497 | 6/1959 | Langdon et al. | 19/303 |
| 2,917,787 | 12/1959 | Thomas et al. | 19/296 |
| 3,034,180 | 5/1962 | Greiner et al. | 19/301 |
| 4,280,253 | 7/1981 | Holt | 19/296 |
| 4,741,941 | 5/1988 | Englebert et al. | 19/301 |
| 4,991,264 | 2/1991 | Greenway et al. | 19/296 |

*Primary Examiner*—William Stryjewski
*Attorney, Agent, or Firm*—C. Michael Gegenheimer; Inger H. Eckert

[57] ABSTRACT

A method and apparatus for distributing reinforcement fibers includes a chute for supplying reinforcement fibers, the chute having an outlet end, and a metering belt mounted for endless travel along a first path at the outlet end of the chute. The metering belt has elongate members with tips extending outwardly from the metering belt, to define a volume between the tips and the metering belt. The tips of the metering belt pass sufficiently close to the chute so that fibers having penetrated the volume formed by the elongate members are carried away by the metering belt. The metering belt is also mounted for endless travel along a second path around a curved surface which causes adjacent elongate members to spread apart and diverge from each other, thereby causing the fibers to be discharged from the metering belt. A collection surface receives the discharged fibers.

17 Claims, 3 Drawing Sheets

METHOD AND APPARATUS FOR DISTRIBUTING LONG FIBERS

TECHNICAL FIELD AND INDUSTRIAL APPLICABILITY OF THE INVENTION

This invention relates in general to distributing fibers for such purposes as making mats of reinforcement fibers or sheet like composite compounds. More particularly, the invention relates to distributing reinforcement fibers generally uniformly on a collecting surface to form evenly reinforced mats or composite sheets. The invention will be useful for making such products as glass fiber reinforcement mats and glass fiber reinforced composite materials.

BACKGROUND OF THE INVENTION

Numerous products are made of matrices, such as resin matrices, which are reinforced with reinforcement fibers. The reinforcement fibers can be introduced into the product in a variety of ways. From the standpoint of industrial production, a major method of introducing fibers into matrices involves the formation of a mat of reinforcement fibers. The reinforced products, generally referred to as "composites", can be used for numerous end uses, including automobile, industrial and domestic equipment as well as electronic components. The reinforcement fibers can be of any material, length, diameter or shape suitable to provide the resin matrix with superior properties, such as strength, stiffness and fire retardancy. Typical reinforcement fibers include mineral fibers, such as glass fibers, organic fibers, such as nylon fibers, and natural fibers, such as flax or sisal. The mineral reinforcement fibers typically have sizes or coatings, involving such polymers as polyvinyl acetate, polyurethane or epoxy.

The formation of a reinforcing mat, and thus the distribution of reinforcement fibers onto a substrate or collection surface, can be accomplished in several ways. The fibers can be mixed with a liquid and formed into a slurry, which is then moved over a porous conveyor where the liquid is removed. This product is known as a wet process mat or wet laid mat. A problem with the wet process is that it requires enormous equipment with associated very high capital investments, and it consumes a significant amount of energy to drive the liquid from the system. The process also requires extensive cleaning to protect the environment.

Another process for distributing fibers is to air lay or air blow them onto a collection surface. The desired effect is uniform distribution and a random orientation, much like the randomness of a snowstorm. A problem with the air laid mat process is that it is difficult to control metering of the fibers (the output rate as a function of time) to allow uniformity along the line axis or machine direction of the mat. It is also difficult to achieve uniform distribution of the fibers transverse to the line direction or machine direction, particularly when the input material is in the form of discontinuous fibers of high aspect ratio (length versus diameter). A uniform air laid distribution of fibers is particularly difficult for wide collection surfaces, such as surfaces wider than one meter.

One problem common to most fiber distribution operations is that the fibers tend to agglomerate or cling together in clumps or tufts, thereby creating areas of high fiber density. This is a problem for both wet laid mats and air laid mats. Some fiber distribution systems are configured to pick apart the clumps or high concentration areas of fibers by pulling apart the clumps of fibers with pins. Even where the fiber distribution apparatus is designed to pick apart the fibers, there is still a great difficulty in producing a uniform distribution of fibers randomly oriented on a collection surface. Also, distribution systems using pins to pick apart or transport fibers have problems with fibers becoming caught or jammed between the pins, and it is difficult to remove the fibers from the pins. Even the use of slippery coatings on the fibers has not solved this problem. Further, trying to distribute long fibers, i.e., longer than about 2 cm, is even more troublesome because the greater amount of intertwining of the long fibers around the pins makes it more difficult to remove the fibers from the pins.

Accordingly, there is a need for a system that can produce a uniform distribution of fibers to make reinforcement mats and reinforced sheet like products. Such system should be able to provide a uniform distribution of fibers on wide collection surfaces, such as those wider than one meter. Also, ideally the system would avoid the use of liquids to avoid high capital investments and energy costs as well as costly pollution control systems. Further, the system should be able to evenly distribute typical long fibers, having a length within the range of from about 2 to about 10 cm.

SUMMARY OF THE INVENTION

The above object as well as other objects not specifically enumerated are achieved by the apparatus and method of the present invention for distributing reinforcement fibers. The apparatus of the invention includes a chute for supplying reinforcement fibers, where the chute has an outlet end. A metering belt is mounted for endless travel along a first path at the outlet end of the chute. The metering belt has elongate members with tips extending outwardly from the metering belt, thereby defining a volume between the tips and the metering belt, the tips of the metering belt running close to the chute so that the fibers having penetrated the volume formed by the elongate members are carried away by the metering belt. The metering belt is also mounted for endless travel along a second path which guides the metering belt around a curved surface. This causes adjacent elongate members to spread apart and diverge from each other, thereby causing the fibers to be discharged from the metering belt. The apparatus also includes a collection surface for receiving the discharged fibers.

According to this invention, there is also provided a method of distributing reinforcement fibers including discharging reinforcement fibers into a chute having an outlet end, withdrawing the fibers from the chute and placing them on a metering belt which is moving along a first path generally parallel to the outlet end of the chute. The metering belt has elongate members with tips extending outwardly from the metering belt, thereby defining a volume between the tips and the metering belt. The tips of the metering belt are moved close to the chute and the fibers having penetrated the volume formed by the elongate members are carried away by the metering belt. The fibers are discharged from the metering belt by moving the belt along a second path around a curved surface, where travel of the metering belt around the curved surface causes adjacent elongate members to spread apart and diverge from each other, thereby releasing the fibers. The discharged fibers are received on a collection surface.

DETAILED DESCRIPTION AND PREFERRED EMBODIMENTS OF THE INVENTION

Figure 1:
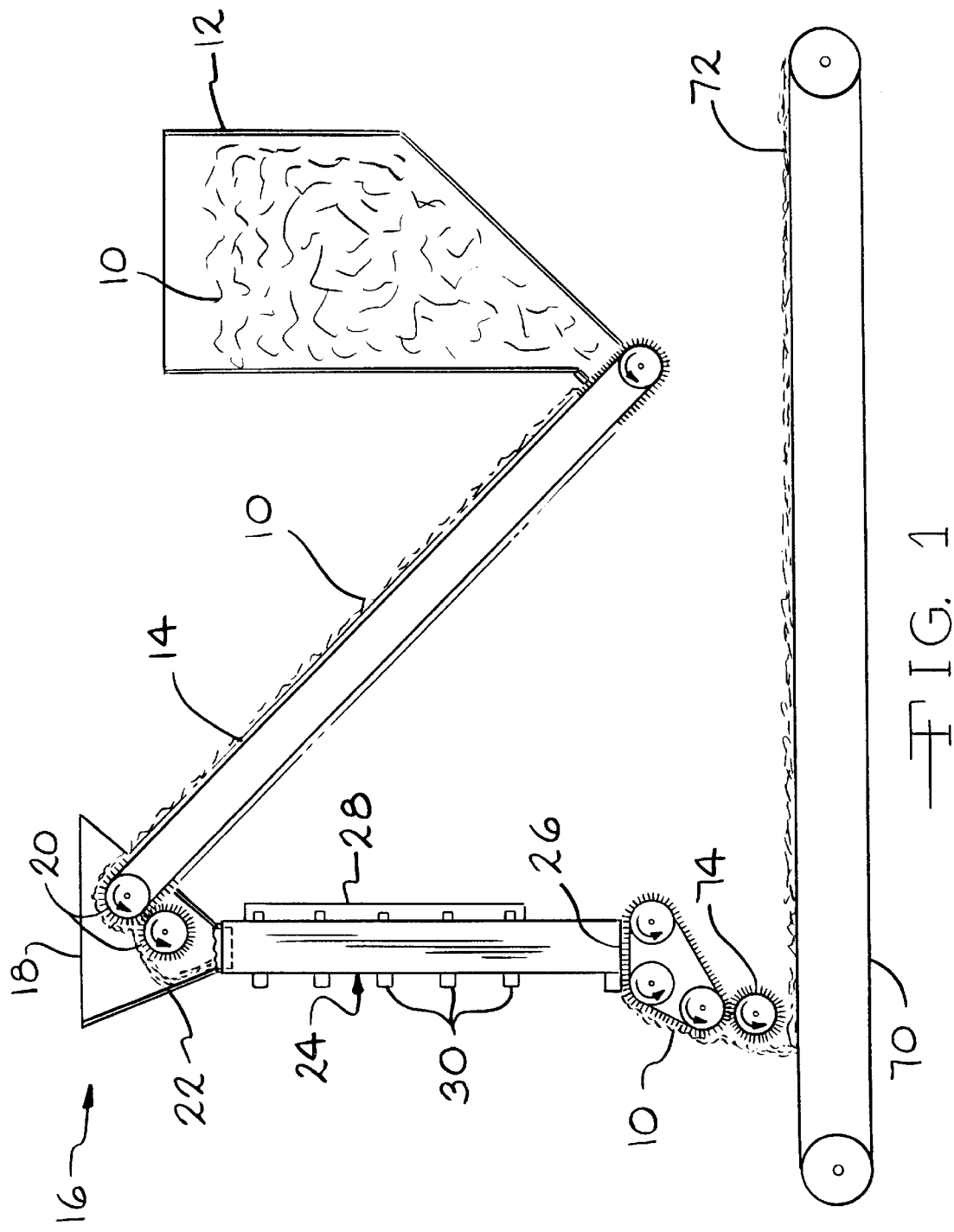
FIG. 1 is a schematic cross-sectional view in elevation of the apparatus for distributing reinforcement fibers of the invention.

Referring now to the drawings, FIG. 1 illustrates apparatus for distributing reinforcement fibers 10. The fibers may be supplied from any source, such as an in-line supply from a fiber forming operation, or such as the storage silo 12 shown in the drawing. The storage silo is connected to a transfer conveyor 14 which feeds the fibers onto the upper spreader 16. In a preferred configuration, the conveyor is a belt equipped with pins similar to those that will be described below for the metering belt so that the transfer conveyor can easily extract fibers from the silo. The upper spreader typically includes a hopper 18 and a spreader roller 20 spinning at a higher speed than the transfer conveyor. The spreader roller is also provided with pins which intermesh with those of the conveyor belt. The impacting action of those pins pulls apart the most concentrated or heaviest density portions of the fibers. As shown, the roller 20 and the transfer conveyor 14 are rotating so that their surfaces move in opposite directions from each other where they meet. The output from the hopper is then in the form of a loose collection of fibers that is somewhat uniform in density. It is to be understood that the just described configuration to reduce the nonuniformities in the fibers is optional, although preferred.

The sidewall or receiving wall 22 of the hopper is preferably at an angle to the vertical so that the fibers are intercepted and slide along the sloping surface into the chute 24, rather than merely fall into the chute. Airborne long fibers sometimes have a tendency to entangle with each other as they fall a long distance through the air thus reforming clumps and disturbing the good uniform distribution which is sought.

The reinforcement fiber can be made of any material suitable for reinforcement purposes. A preferred material is a long fiber chopped strand, which can be obtained from Owens Corning, Toledo, Ohio, although other mineral fibers and organic fibers, such as polyester, Kevlar® and carbon fibers, can be used with the invention. It is to be understood that the reinforcement fibers can be a single filament (monofilament), although for most reinforcement applications the fibers are chopped bundles containing numerous filaments. A preferred material for the fibers 10 is a chopped strand having about 50 to about 200 filaments in each bundle, and more preferably having about 100 filaments in each bundle. The bundles of the fibers 10 preferably have a length within the range of from about 20 to about 100 mm, and have a diameter of about 0.5 mm, although the bundles may be somewhat flattened to have cross-sectional dimensions of about 1 mm on the long axis and about 0.25 mm on the short axis.

Once the fibers pass through the upper spreader 16, they travel downwardly through the vertically oriented chute 24. The chute can be any conduit for supplying and directing the fibers along the path toward the ultimate metering device. The fibers preferably move by gravity in the chute toward the outlet end 26 at the bottom of the chute. In the alternative, a mechanical or pneumatic means, not shown, can be used to urge the fibers toward the bottom of the chute. It is important not to overly compress the fibers in the chute because that may cause some of the fibers to become entangled and result in greater nonuniformities in the resulting distribution of the fibers.

The rate at which the fibers are removed from the chute 24 is a function of the pressure on the fibers at the bottom of the chute. If the fibers are moved through the chute merely by gravity, this pressure on the fibers should be a function of the height of the column of fibers and of their apparent density of natural stacking in the chute. By operating with a constant height of fibers in the chute, the pressure of the fibers at the bottom of the chute can be made generally constant, thereby helping to achieve good uniformity in the produced mat both in the line or machine direction and the transverse or cross-machine direction of the product. A typical pressure of the fibers at the bottom of the chute is within the range of from about 2,000 Pa to about 20,000 Pa, and preferably about 6,000 Pa.

Several different level indicators can be used to monitor the height of fibers within the chute. For example, the chute can be provided with a vertical array 28 of light sources which is aligned with a corresponding series of photocells 30. The fibers in the chute block the transmission of light from the light sources to the photocells, thereby providing an indication of the height of the column of fibers in the chute. Other methods, such as using sonar or providing for visual observation, can be used to determine the height of the fibers in the chute. To ensure a constant height of material in the chute one can make use of a closed loop system between sensors measuring the height of material and the motor driving the transfer conveyor 14. The supply rate of fibers into the chute is typically adjusted in response to the measured height of the fibers so as to maintain this height at a constant level. The control of the height of the fibers and the system of uniform packing of fibers, provided by the upper spreader 16 and the angled receiving wall 22, enable the pressure of the fibers to be controlled, leading to a uniform withdrawal of fibers from the chute and a more uniform distribution of fibers in the ultimate product.

Figure 2:
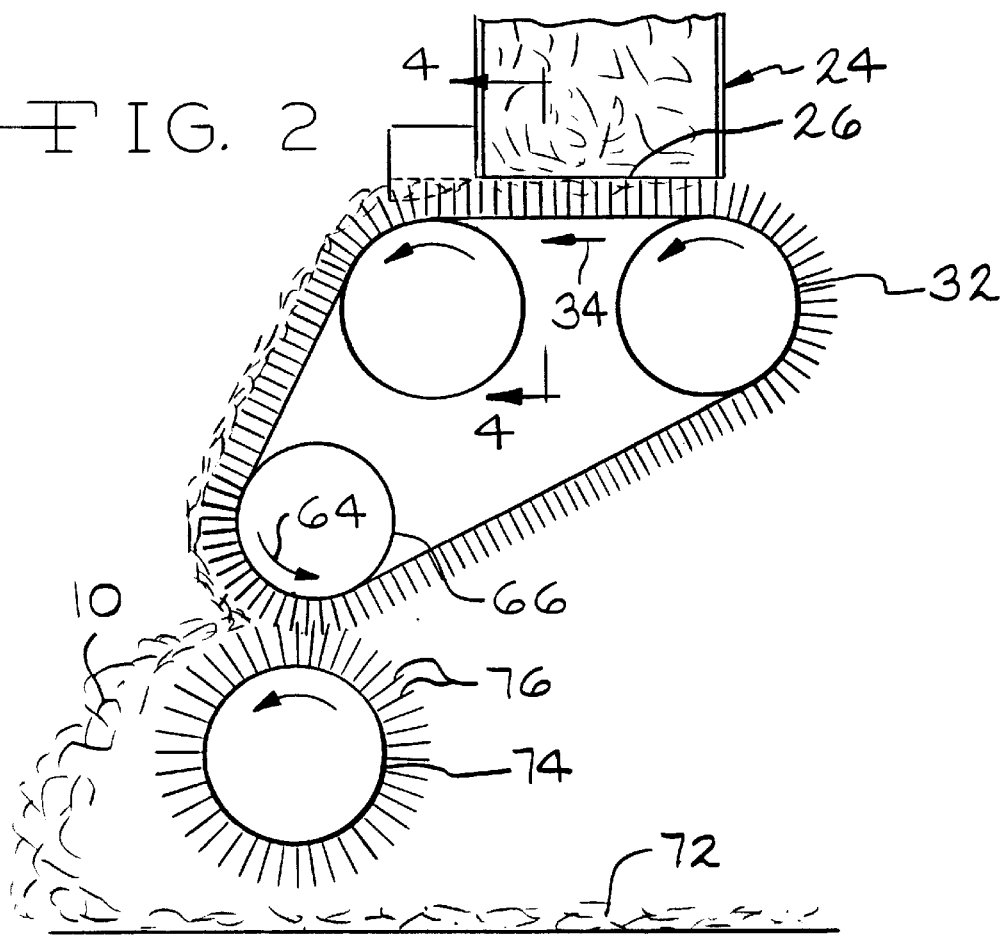
FIG. 2 is a schematic cross-sectional view in elevation of the metering belt and outlet of the chute of the apparatus of shown in FIG. 1.

As more clearly shown in FIGS. 2 and 3, at the outlet end 26 of the chute the metering belt 32 withdraws fibers from the chute and carries them away for later discharge. The metering belt 32 is mounted for endless travel and can be powered by any suitable means, such as an electric motor, not shown. The metering belt travels along a first path 34 at the outlet end 26 of the chute. The metering belt has numerous elongate members, such as pins 36 having tips 38, projecting out or extending outwardly to contact and engage the fibers at the outlet end of the chute. The pins extending outwardly from the metering belt form or define a volume 40 between the tips and the metering belt, as shown most clearly in FIG. 5. The first path of the tips runs close to the outlet end, and the fibers that have penetrated the volume are withdrawn from the chute and carried away by the metering belt.

The metering belt can be made of any material that is flexible and suitable for endless travel and for mounting the pins. A preferred material is a reinforced rubber material, although an open mesh steel belt can also be used. The pins 36 can be any elongate member extending outwardly from the belt suitable for engaging the fibers. The pins can be made of any material, such as stainless steel. Preferably, the pins are conical in shape, ending in the tips 38. In a preferred embodiment of the invention, the pins project about 30 mm from the surface of the metering belt, and taper or are reduced in diameter from a diameter of about 6 mm at the base of the pin to a much smaller dimension at the tip, such as a dull point with a diameter of about 0.5 mm.

The amount of fibers withdrawn from the chute is dependent not only on the pressure of the fibers at the bottom of the chute, but also on the packing of the pins. Another factor determining the amount of fibers withdrawn by the metering belt is the geometry of the pins, mainly the sharpness of the taper of the pins. The smaller the angle of taper of the pins, the more fibers will be grabbed by the pins. Where the pins are too closely packed together on the metering belt, the fibers will not be grabbed by the pins, and instead will merely rest on the top of the pins. Therefore, fewer of the fibers will penetrate into the volume 40. Where the pins are spaced too far apart, the pins will not be able to adequately perform the function of pulling homogeneous quantities of fibers, and high density concentrations of fibers positioned between the pins will be carried away by the metering belt. Preferably, the pins will be spaced at a distance from each other equal to about one-half the length of the fibers.

Figure 4:
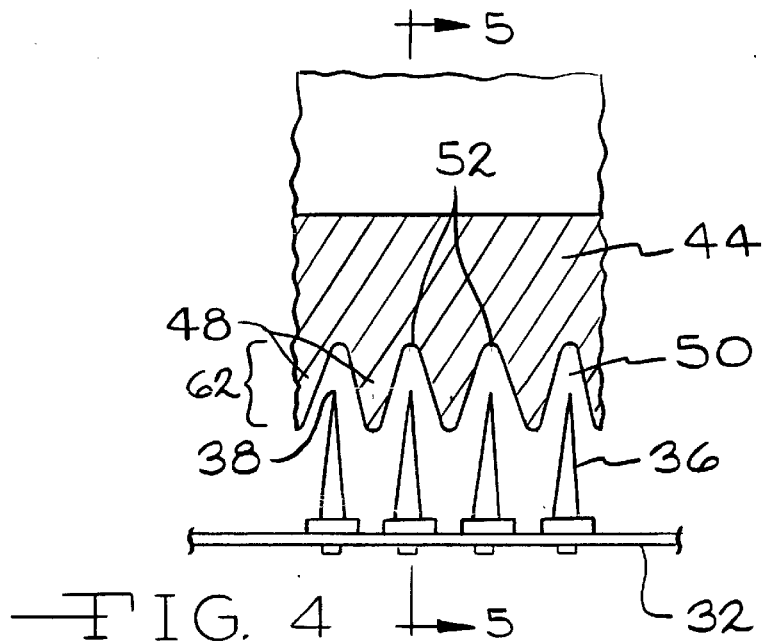
FIG. 4 is a schematic cross-sectional view in elevation of the metering belt and doctor blade of FIG. 2, taken along line 4—4.
Figure 5:
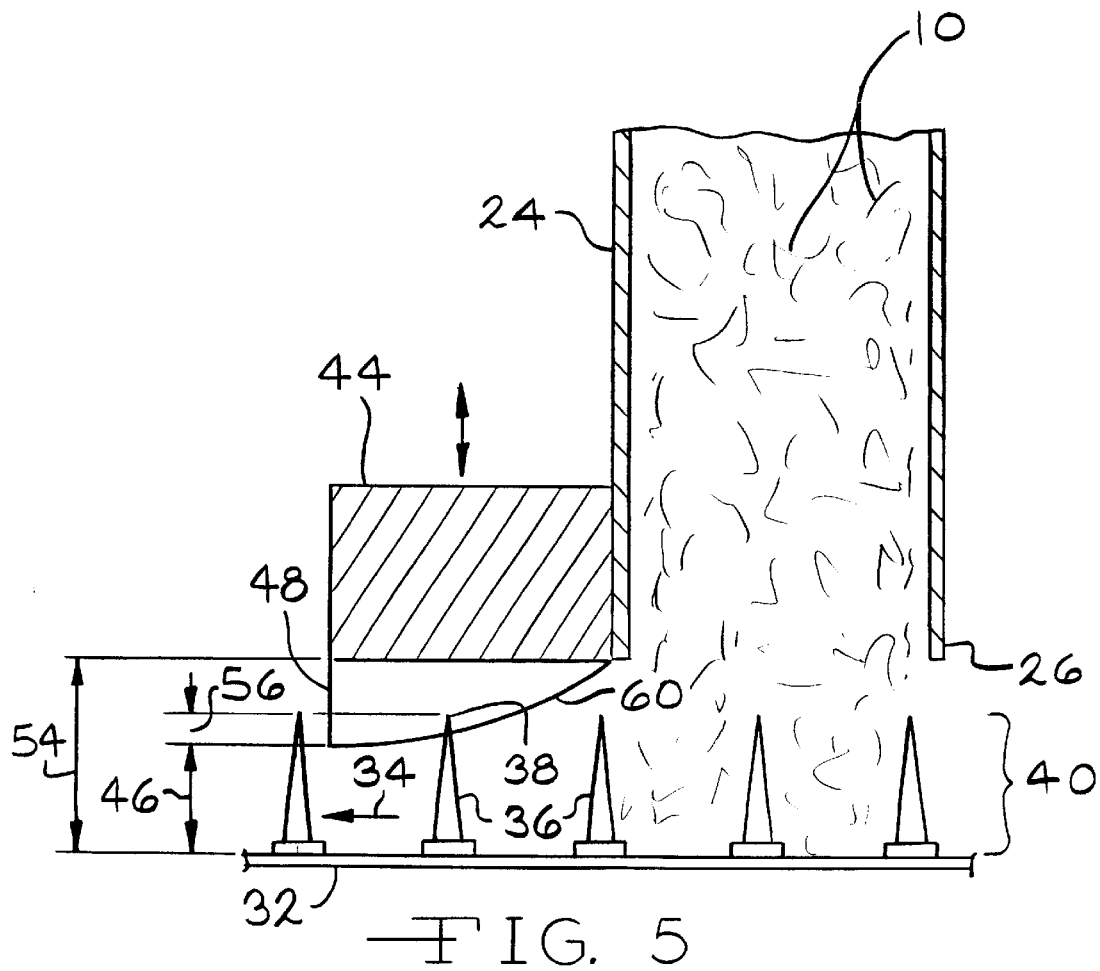
FIG. 5 is a schematic cross-sectional view in elevation of the apparatus shown in FIG. 4, taken along line 5—5.

At the downstream end of the chute outlet 26 a doctor blade 44 is positioned to meter the amount of fibers 10 being carried away per unit of time by the metering belt. The doctor blade can be a conventional straight edged barrier, or can be serrated to provide a greater interaction between the pins 36 and the doctor blade 44, as shown in FIGS. 4 and 5. The doctor blade defines a gap 46 between the doctor blade and the metering belt 32. The doctor blade can be made of any suitable material such as stainless steel, which has the advantage of being able to be grounded to discharge static electricity which might otherwise be built up. The doctor blade can be mounted in any suitable manner, such as by bolting it onto the wall of the chute 24. Preferably, the doctor blade is adjustably mounted to enable its vertical adjustment.

The serrated doctor blade 44 has a series of projections 48 defining slots 50. The uppermost portions 52 of the slots 50 define an overall gap 54, which is the maximum clearance between the doctor blade and the metering belt 32. The pins 36 in the metering belt are aligned with the slots so that the pins do not interfere with the projections 48 of the doctor blade. In this manner, the pins 36 can extend up toward the chute outlet 26 to an extent that the pins overlap the projections 48 without actually contacting the projections. The amount of overlap is indicated at 56 in FIG. 5. A typical amount of overlap is about 10 mm.

As shown in FIG. 5, the projections 48 need not be merely downwardly projecting teeth or spikes, but can be elongated for an extended length along the first path 34, in the line or machine direction, so that they are shaped like fins. The projections 48 will generally be shaped with a sloped profile 60 so that they extend from the doctor blade 44 toward the metering belt with an increasing height 62 along the direction of the first path 34. This will allow the fibers 10 to be gradually engaged by the pins 36 as the pins pass through the slots 50. As the metering belt travels across the chute, the fibers will be gradually pressed down onto the pins.

Figure 3:
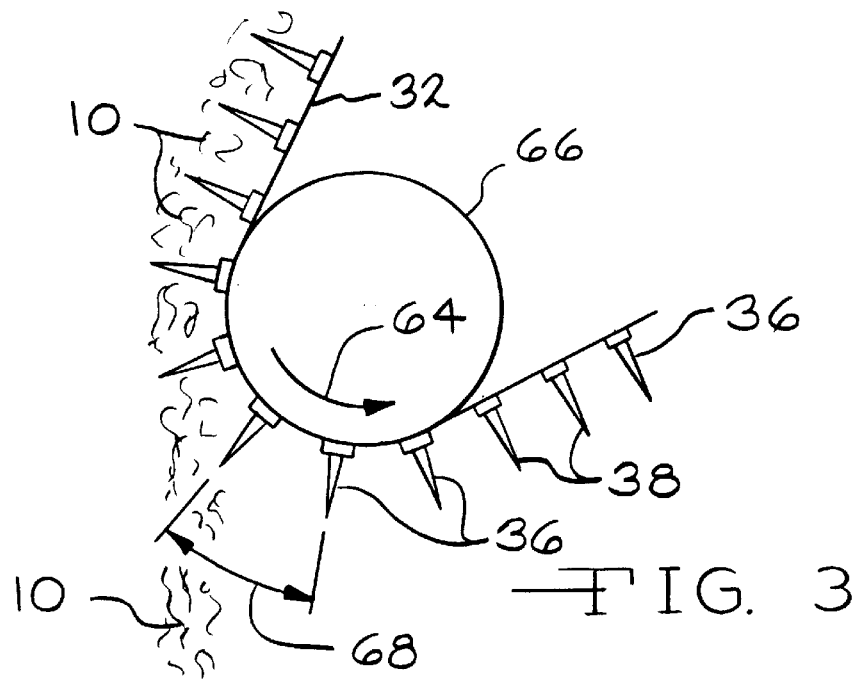
FIG. 3 is a schematic cross-sectional view in elevation of the lower roller and the reinforcement fibers being discharged from the metering belt.

After the metering belt 32 picks up the fibers as the metering belt travels along the first path, the metering belt travels along a second path 64 which guides the metering belt to bend around lower roller 66 with the pins in a downward orientation (see FIGS. 3 and 4). Although roller 66 is shown, it is to be understood that the metering belt can be guided to bend around any curved surface as long as the result is the causing of the tips 38 of adjacent pins 36 to spread apart or diverge from each other as the metering belt travels around the curved surface. The maximum angle of divergence, indicated at 68, is preferably at least 5 degrees.

The advantage of having the pins diverge while the metering belt is upside down is that the fibers 10 carried by the metering belt will be more likely to be discharged or fall off the metering belt. The release of the fibers is also facilitated by the conical nature of the pins. The apparatus and method of the invention enable a uniform discharge of fibers in a way not before thought possible. One of the problems with metering fibers heretofore is that more flexible fibers can get caught or jammed between the pins and it is difficult to remove the fibers from the pins. Therefore, typical pin metering apparatus has been effective only for relatively stiff fibers. However, the use of pins having a conical surface according to the present invention, and the positioning of the discharge of the fibers from the metering belt at a point where the pins are diverging, enables the apparatus to handle fibers which are softer or which have more flexibility than previously thought possible. For example, using a similar apparatus to that shown in FIG. 1, but not including the features of the present invention, fibers would be limited to a length no longer than about 25 mm, and the fibers would have to be very stiff and needle-like to avoid becoming jammed during distribution. Using the apparatus and method of the present invention, however, fibers having a flexibility found in conventional multifilament reinforcement fibers, i.e., relatively soft or flexible fibers such as a choppable roving, may be successfully distributed without substantial clogging of the pins. This has been demonstrated by mounting pins on a rigid board, passing the board across the bottom of a chute to withdraw fibers, and inverting the board to cause the fibers to fall from the board solely under the effect of gravity. The method and apparatus of the invention also enable the use of longer fibers than previously thought possible. Fibers up to 10 cm and longer can be distributed, and possibly continuous fibers can also be so distributed.

The discharged fibers 10 ultimately end up on the collection surface, which is indicated as conveyor belt 70 in FIG. 1. There the fibers can be formed into a mat 72, and a binder material can be added to bond the fibers together. Alternatively, resin can be applied to make a moldable material. In a typical configuration, the resin can be applied onto a carrier film, not shown, traveling on the conveyor belt before the fibers are discharged onto the belt. The speed of the conveyor belt 70 is typically within the range of from about 5 to about 40 meters per minute, whereas the speed of the metering belt is typically about twice the speed of the conveyor belt.

Optionally, a spreader drum 74 can be positioned to receive the fibers 10 from the metering belt and deposit them on the collection surface. This will enhance the homogeneity and the randomness of the fibers in the formed mat. The spreader drum 74 can be provided with spikes 76 which intermesh with the pins 36 on the metering belt 34 to help discharge the fibers from the metering belt. Preferably, the spreader drum 74 is rotating so that the spikes 76 move in opposition to the metering belt pins 36. The spreader drum spikes 76 are preferably longer than the pins 36 on the metering belt, and are typically about 60 mm long. Preferably the spreader drum spikes are generally rounded rather than sharp at their tips. The spreader drum can be operated at any linear speed faster than the lineal speed of the metering belt, but preferably at a linear surface speed of about ten times the linear speed of the metering belt, or about 200 meters per minute. The spreader drum can be of any appropriate size, preferably having a diameter within the range of from about 20 to about 40 cm.

Although the chute is shown in a vertical orientation, it is to be understood that the principles of the invention can be carried out at any angle to the vertical with the chute in a horizontal position. In such an embodiment, the metering belt would travel vertically past the outlet of the chute to engage the fibers and withdraw them from the chute. Also, although only one upper spreader 16 and one spreader drum 74 are shown, more than one of each of these fiber randomizing devices can be used with the invention. Although the invention has been illustrated with chopped fibers as the reinforcement fibers being distributed, it is to be understood that the invention can be used with continuous fibers to make continuous strand mats of continuous fibers.

The principle and mode of operation of this invention have been described in its preferred embodiment. However, it should be noted that this invention may be practiced otherwise than as specifically illustrated and described without departing from its scope.

What is claimed is:

1. Apparatus for distributing reinforcement fibers comprising:
   a chute for supplying reinforcement fibers, the chute having an outlet end;
   a metering belt mounted for travel along a first path at the outlet end of the chute, the metering belt having elongate members with tips extending outwardly from the metering belt, thereby defining a volume between the tips and the metering belt, the tips of the metering belt running close to the chute so that the fibers having penetrated the volume formed by the elongate members are carried away by the metering belt, where the chute has a doctor blade to define a gap between the doctor blade and the moving elongate members to control the amount of fibers withdrawn from the chute, and where the metering belt is also mounted for travel along a second path which guides the metering belt to bend around a curved surface which causes adjacent elongate members to spread apart and diverge from each other, thereby causing the fibers to be discharged from the metering belt; and
   a collection surface for receiving the discharged fibers.

2. The apparatus of claim 1 in which the elongate members comprise conically shaped pins.

3. The apparatus of claim 1 in which the curved surface is a roller, and where the elongate members are pointed downward as the metering belt travels along the second path.

4. The apparatus of claim 1 in which the doctor blade is serrated and has a series of projections and slots, with the slots being in alignment with the elongate members.

5. The apparatus of claim 4 in which the projections have an increasing height along the direction of the first path.

6. The apparatus of claim 1 including a level measuring device to assess the height of the fibers in the chute.

7. The apparatus of claim 1 including a spreader roller for receiving the fibers from a source of the fibers, for rearranging the fibers into a more uniform distribution, and for discharging the fibers into the chute.

8. The apparatus of claim 1 in which the maximum angle of divergence of the elongate members, when adjacent elongate members spread apart and diverge from each other as the metering belt travels along the second path is at least 5 degrees.

9. The apparatus of claim 1 in which the first path is straight so that the elongate members are substantially parallel to each other as they travel along the outlet end of the chute.

10. The apparatus of claim 9 in which the doctor blade is serrated and has a series of projections and slots, with the slots being in alignment with the elongate members, and in which the elongate members comprise conically shaped pins.

11. Apparatus for distributing reinforcement fibers comprising:
    a vertically oriented chute for supplying reinforcement fibers, the chute having an outlet end at its bottom;
    a metering belt mounted for travel along a first path at the outlet end of the chute, the metering belt having pins with tips extending outwardly from the metering belt, thereby defining a volume between the tips and the metering belt, the tips of the metering belt running close to the chute so that the fibers having penetrated the volume formed by the pins are carried away by the metering belt, where the chute has a doctor blade to define a gap between the doctor blade and the moving elongate members to control the amount of fibers withdrawn from the chute, and where the metering belt is also mounted for travel along a second path which guides the metering belt to bend around a roller, where travel of the metering belt around the roller causes the tips of adjacent pins to spread apart and diverge from each other, thereby causing the fibers to be discharged from the metering belt; and
    a collection surface for receiving the discharged fibers.

12. The apparatus of claim 11 including a pair of spreader rollers for receiving the fibers, for rearranging the fibers into a more uniform distribution, and for discharging the fibers into the chute, and further including a sloped wall mounted at an acute angle to the vertical for receiving the fibers from the spreader rollers.

13. The apparatus of claim 11 where the doctor blade is serrated and has a series of projections and slots, with the slots being in alignment with the pins, where the pins are conically shaped, and where the maximum angle of divergence of the pins, when adjacent elongate members spread apart and diverge from each other as the metering belt travels along the second path, is at least 5 degrees.

14. A method of distributing reinforcement fibers comprising:
    discharging reinforcement fibers into a chute having an outlet end;
    withdrawing the fibers from the chute and placing them on a metering belt which is moving along a first path generally parallel to the outlet end of the chute, the metering belt having elongate members with tips extending outwardly from the metering belt, thereby defining a volume between the tips and the metering belt, where the tips of the metering belt are moved close to the chute so that the fibers having penetrated the volume formed by the elongate members are carried away by the metering belt;
    metering the fibers from the chute with a doctor blade which defines a gap between the doctor blade and the moving elongate members to control the amount of fibers withdrawn from the chute;
    discharging the fibers from the metering belt by moving it along a second path which guides the metering belt to bend around a curved surface which causes adjacent elongate members to spread apart and diverge from each other, thereby releasing the fibers; and
    receiving the discharged fibers on a collection surface.

15. The method of claim 14 including, prior to the step of discharging the reinforcement fibers into the chute, rearranging the fibers with a spreader roller capable of receiving the fibers from a source of the fibers, and capable of rearranging the fibers into a more uniform distribution.

16. The method of claim 14 including causing the elongate members to diverge from each other, when the metering belt travels along the second path, with a maximum angle of divergence of at least 5 degrees.

17. The method of claim 14 including determining the height of the fibers in the chute.

* * * * *